United States Patent [19]
Gardiner et al.

[11] Patent Number: 5,482,324
[45] Date of Patent: Jan. 9, 1996

[54] SUPPLEMENTAL CAR SEAT BELT FOR PROTECTING USERS WTIH STOMAS

[76] Inventors: Linda J. Gardiner; George E. Gardiner, both of 3309 SE. 3rd Ave., Camas, Wash. 98607

[21] Appl. No.: 323,843

[22] Filed: Oct. 17, 1994

[51] Int. Cl.⁶ ................................................ B60R 22/00
[52] U.S. Cl. ......................... 280/801.1; 297/482; 297/468
[58] Field of Search ............................... 280/801.1, 805, 280/808, 748, 751; 297/468, 470, 471, 482, 483

[56] References Cited

U.S. PATENT DOCUMENTS

| | | | |
|---|---|---|---|
| 2,619,362 | 11/1952 | Low | 280/805 |
| 2,822,033 | 2/1958 | Dixon | 297/468 |
| 4,205,670 | 6/1980 | Owens | 297/468 |
| 4,619,468 | 10/1986 | Spill | 280/801.1 |
| 4,706,992 | 11/1987 | Downing et al. | 280/801.1 |
| 4,741,574 | 5/1988 | Weightman et al. | 280/801.1 |
| 4,951,965 | 8/1990 | Brown | 280/801.1 |
| 5,005,865 | 4/1991 | Kruse | 280/801.1 |
| 5,074,588 | 12/1991 | Huspen | 280/801.1 |
| 5,074,795 | 12/1991 | Clark | 280/801.1 |
| 5,248,187 | 9/1993 | Harrison | 297/482 |

FOREIGN PATENT DOCUMENTS 2690398  10/1993  France ................................ 280/801.1

*Primary Examiner*—Margaret A. Focarino
*Assistant Examiner*—Peter C. English

[57] ABSTRACT

A supplemental car seat belt for protecting users with stomas comprising a belt positionable about the waist of a wearer with a stoma, the belt being formed of two components with interior ends and exterior ends, the exterior ends being fabricated with intermating fasteners to allow the coupling and uncoupling thereof; a cushion fabricated of an elastomeric foam with long upper and lower edges and short vertical side edges and with a front surface positionable away from the wearer and a rear surface positionable adjacent to the wearer, the foam having a cover layer over its entire surface, and also including attachments to permanently secure the inboard edges of the belt halves to the cushion at an interface between the side edges and the rear face; and loops to couple the cushion and the belt to a vehicle seat belt.

1 Claim, 4 Drawing Sheets

SUPPLEMENTAL CAR SEAT BELT FOR PROTECTING USERS WTIH STOMAS

BACKGROUND OF THE INVENTION

1. Field of the Invention

The present invention relates to a supplemental car seat belt for protecting users with stomas and more particularly pertains to providing car seat security to occupants of a vehicle while additionally providing security against damage to stomas of the users.

2. Description of the Prior Art

The use of car seat belts of a wide variety of designs and configurations is known in the prior art. More specifically, car seat belts of a wide variety of designs and configurations heretofore devised and utilized for the purpose of providing protection for people riding in cars from various injuries through a wide variety of methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,971,569 a safety seat belt device with an inflatable cushioning means.

U.S. Pat. No. 4,741,574 discloses a seat belt cover and cushion.

U.S. Pat. No. 4,901,407 discloses a vehicular seat belt covering.

U.S. Pat. No. 5,178,614 discloses a protective shield for a stoma pough.

U.S. Pat. No. Des. 302,748 discloses the design of a protective pad for a seat belt.

In this respect, the supplemental car seat belt for protecting users with stomas according to the present invention substantially departs from the conventional concepts and designs of the prior art, and in doing so provides an apparatus primarily developed for the purpose of providing car seat security to occupants of a vehicle while additionally providing security against damage to stomas of the users.

Therefore, it can be appreciated that there exists a continuing need for a new and improved supplemental car seat belt for protecting users with stomas which can be used for providing car seat security to occupants of a vehicle while additionally providing security against damage to stomas of the users. In this regard, the present invention substantially fulfills this need.

SUMMARY OF THE INVENTION

In view of the foregoing disadvantages inherent in the known types of car seat belts of a wide variety of designs and configurations now present in the prior art, the present invention provides an improved supplemental car seat belt for protecting users with stomas. As such, the general purpose of the present invention, which will be described subsequently in greater detail, is to provide a new and improved supplemental car seat belt for protecting users with stomas and method which has all the advantages of the prior art and none of the disadvantages.

To attain this, the present invention essentially comprises a new and improved supplemental car seat belt for protecting users with stomas comprising, in combination, a belt positionable about the waist of a wearer with a stoma, the belt being formed of two components with interior ends and exterior ends, the exterior ends being fabricated with intermating pile-type fasteners to allow the coupling and uncoupling thereof; a cushion fabricated of an elastomeric foam with long upper and lower edges and short vertical side edges and with a front surface positionable away from the wearer and a rear surface positionable adjacent to the wearer, the foam having a cover layer over its entire surface, and also including attachment stitching to permanently secure the inboard edges of the belt halves to the cushion at an interface between the side edges and the rear face; and a pair of supplemental loops, the supplemental loops being fabricated of a pair of straps having central extents secured through the front surface of the cushion with upper edges extending upwardly therefrom and downward edges extending downwardly therefrom, the upper and lower edges of the supplemental belt loops being fabricated with a pile-type fastener to allow the intercoupling of the free ends of the loops to form two closed loops for the passage therethrough of an automotive seat belt.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved supplemental car seat belt for protecting users with stomas which has all the advantages of the prior art car seat belts of a wide variety of designs and configurations and none of the disadvantages.

It is another object of the present invention to provide a new and improved supplemental car seat belt for protecting users with stomas which may be easily and efficiently manufactured and marketed.

It is further object of the present invention to provide a new and improved supplemental car seat belt for protecting users with stomas which is of a durable and reliable construction.

An even further object of the present invention is to provide a new and improved supplemental car seat belt for protecting users with stomas which is susceptible of a low cost of manufacture with regard to both materials and labor, and which accordingly is then susceptible of low prices of sale to the consuming public, thereby making such supplemental car seat belt for protecting users with stomas economically available to the buying public.

Still yet another object of the present invention is to provide a new and improved supplemental car seat belt for protecting users with stomas which provides in the apparatuses and methods of the prior art some of the advantages thereof, while simultaneously overcoming some of the disadvantages normally associated therewith.

Still another object of the present invention is to provide car seat security to occupants of a vehicle while additionally providing security against damage to stomas of the users.

Lastly, it is an object of the present invention to provide a new and improved supplemental car seat belt for protecting users with stomas comprising a belt positionable about the waist of a wearer with a stoma, the belt being formed of two components with interior ends and exterior ends, the exterior ends being fabricated with intermating fasteners to allow the coupling and uncoupling thereof; a cushion fabricated of an elastomeric foam with long upper and lower edges and short vertical side edges and with a front surface positionable away from the wearer and a rear surface positionable adjacent to the wearer, the foam having a cover layer over its entire surface, and also including attachments to permanently secure the inboard edges of the belt halves to the cushion at an interface between the side edges and the rear face; and loops to couple the cushion and the belt to a vehicle seat belt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
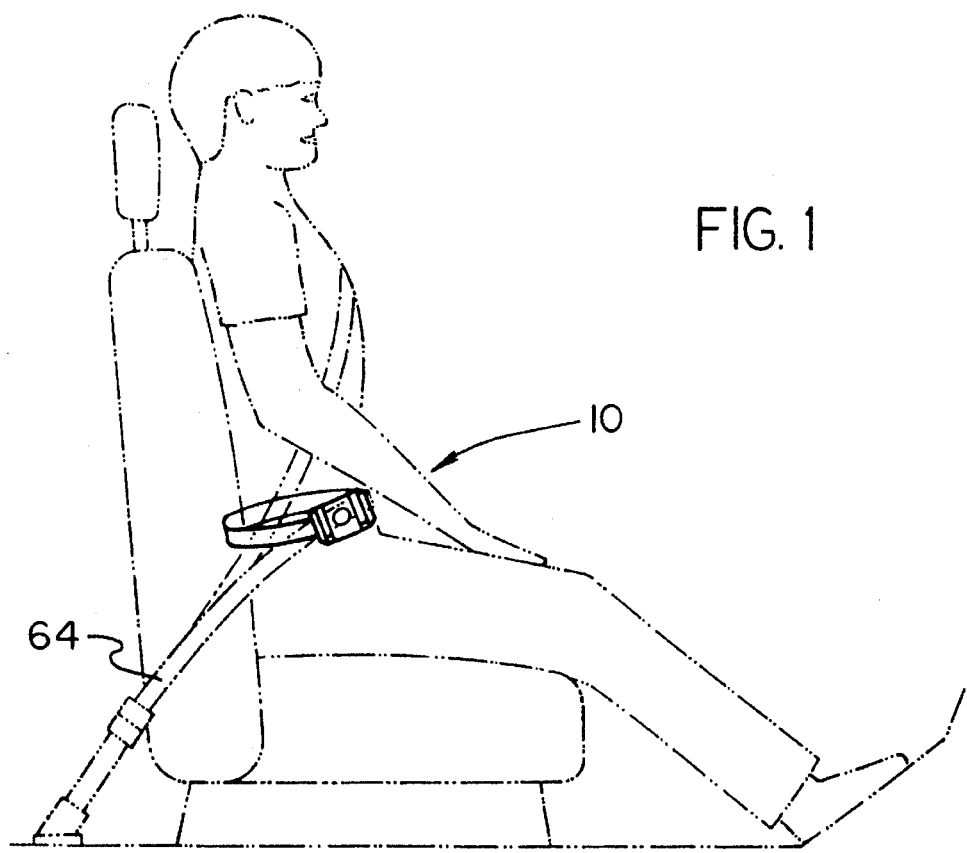
FIG. 1 is a side elevational view of the preferred embodiment of the new and improved supplemental car seat belt for protecting users with stomas constructed in accordance with the principles of the present invention.
Figure 2:
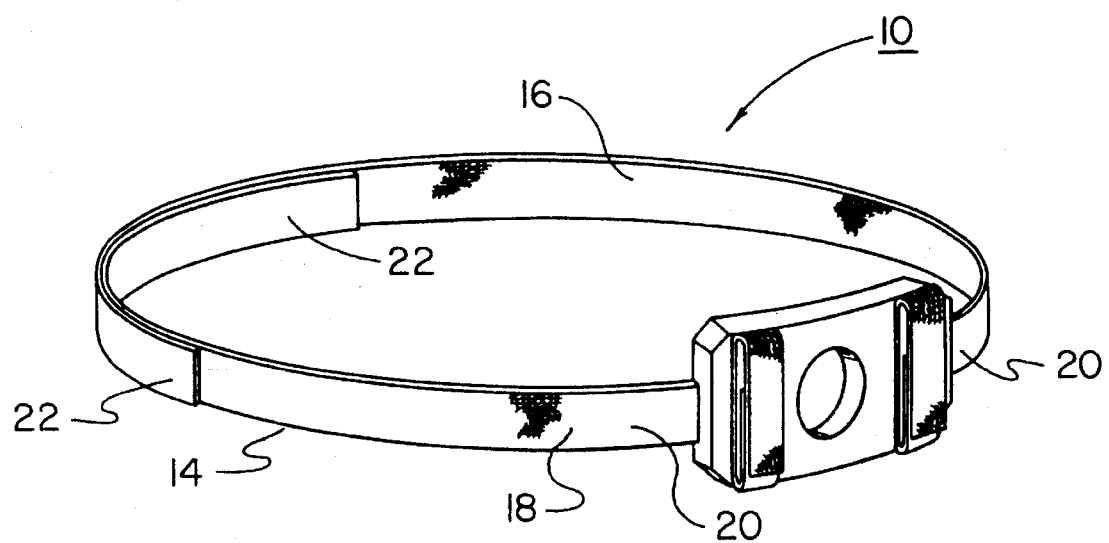
FIG. 2 is a perspective view of the belt shown in FIG. 1.
Figure 3:
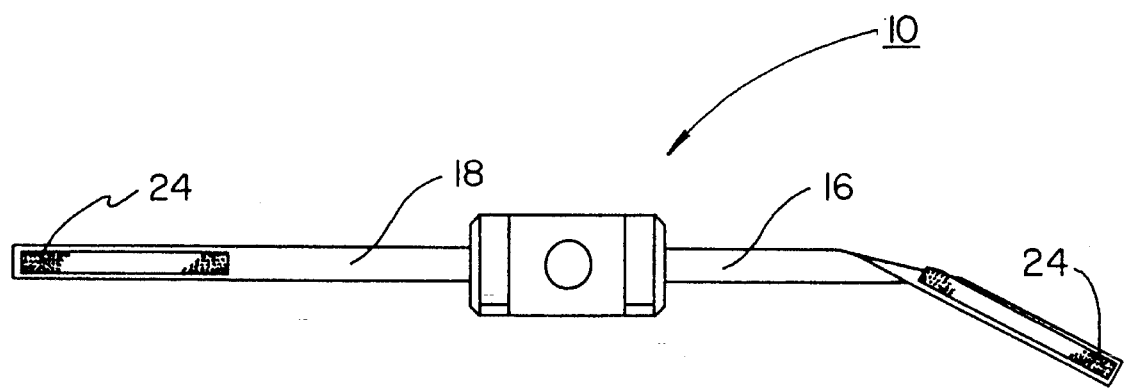
FIG. 3 is a front elevational of the belt shown in FIGS. 1 and 2.
Figure 4:
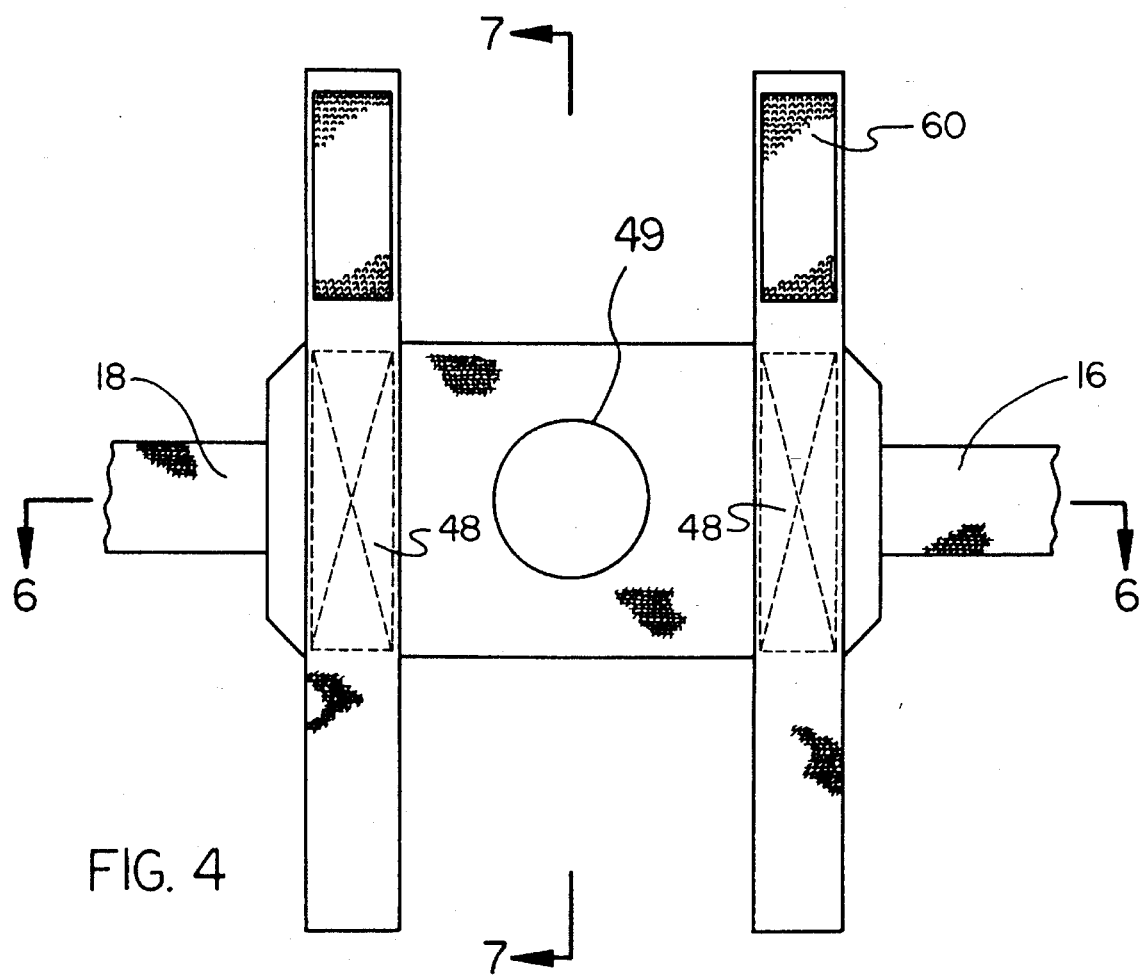
FIG. 4 is an enlarged front view of the central cushion area of the belt of the prior Figures with its various straps extending outwardly therefrom.
Figure 5:
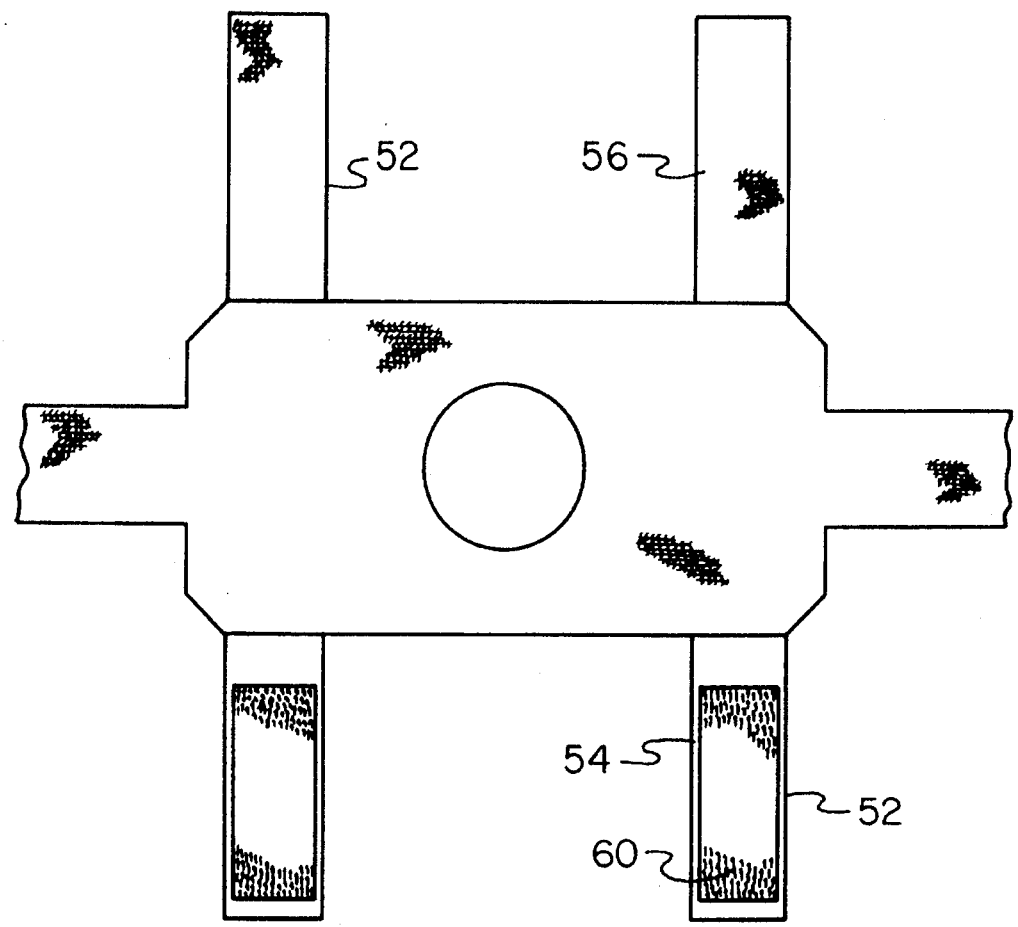
FIG. 5 is a rear elevational view of that portion of the belt shown in FIG. 4.
Figure 6:
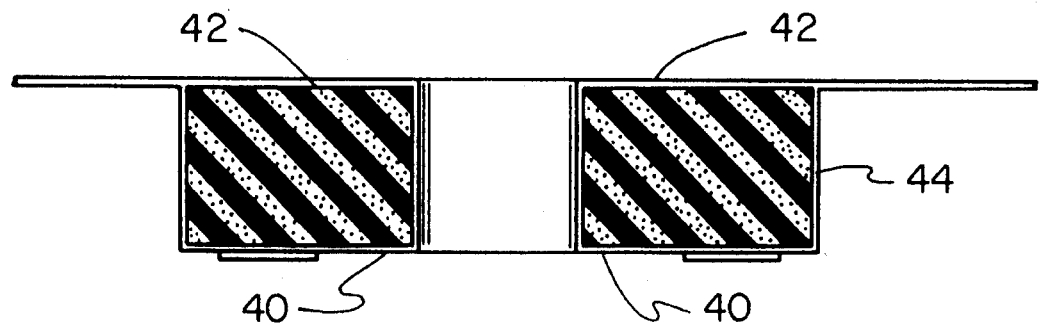
FIG. 6 is a cross-sectional view taken along line 6—6 of FIG. 4.
Figure 7:
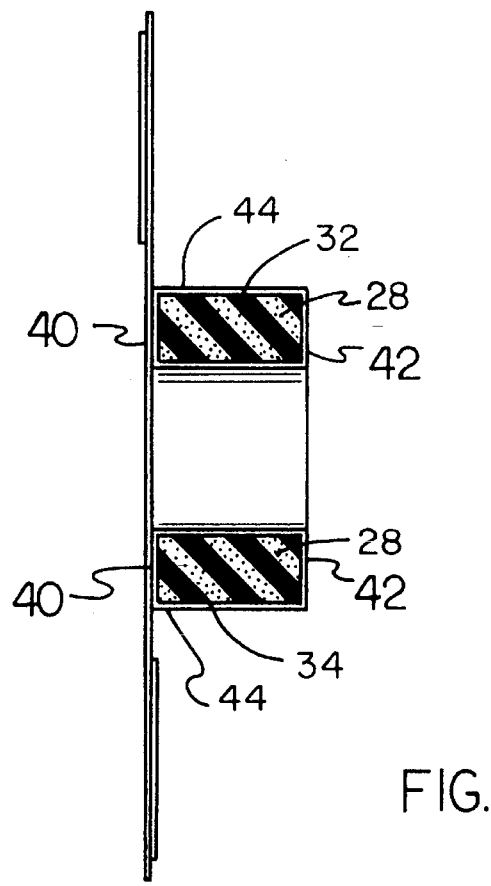
FIG. 7 is a cross-sectional view taken along line 7—7 of FIG. 4.
Figure 8:
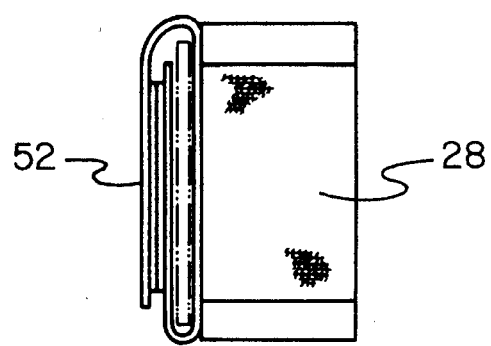
FIG. 8 is an end elevational view of the cushion portion of the belt of the prior Figures.

With reference now to the drawings, and in particular to FIG. 1 thereof, the preferred embodiment of the new and improved supplemental car seat belt for protecting users with stomas embodying the principles and concepts of the present invention and generally designated by the reference numeral 10 will be described.

The present invention, the new and improved supplemental car seat belt for protecting users with stomas, is a system 10 comprised of a plurality of components. Such components, in their broadest context, include a belt, a cushion and coupling loops therebetween. Such components are individually configured and correlated with respect to each other so as to attain the desired objective.

More specifically, it will be noted that the central component of the system 10 is a belt 14. The belt is positionable about the waist of a wearer with a stoma. The belt is formed with two components 16, 18 with interior ends 20 and exterior ends 22. The exterior ends are fabricated with intermating pile-type fasteners 24. Such is to allow for the easy coupling and uncoupling of the ends of the belt.

Next provided is a cushion 28. The cushion is fabricated of an elastomeric foam preferably closed cell polyurethane foam. It is formed with long upper and lower edges 32, 34. It is also formed with short vertical side edges 36 coupling the upper and lower edges. It is also formed with a front surface 40. The front surface is positionable away from the wearer. It is also formed with a rear surface 42 which is positionable adjacent to the wearer. The foam is provided with a cover layer 44 over its entire surface. The cushion includes a centrally positioned circular aperture 49. In an operative orientation, the aperture is positioned around the stoma of the user. Stitching 48 is provided to permanently secure the inboard edges of the belt halves to the cushion at an interface between the side edges and the rear face.

Lastly provided is a pair of supplemental loops 52. The supplemental loops are fabricated of a pair of straps 54 and 56. Such straps have central extents secured as through stitching 48 through the front surface of the cover at the cushion. The loops have upper edges extending upwardly therefrom and downward edges extending downwardly therefrom. The upper and lower edges of the supplemental belt loops are fabricated with a fastener 60, preferably a pile-type fastener. This is to allow the intercoupling of the free ends of the loops. This is to form two closed loops for the passage therethrough of an automotive seat belt 64.

The present invention protects and cushions an abdominal stoma from damage it can suffer from the ordinary use of a seat belt. It prevents accidental severance of the stoma which can be very traumatic and life threatening.

The present invention consists of a cushion that is attached to the person with a strap that wraps around the seat belt. The former has a circular shape with a recess on the rear surface. Two straps extend from opposite sides, and utilize hook and loop material to secure the cushion around the waist. The cushion is constructed of a durable foam material one and one half inches thick, and covered with a smooth vinyl laminate. The cushion may be covered with a removable envelope which can be removed and discarded or laundered. Straps are made of the same material as the cushion. The hook and loop material permits the present invention to be adjusted for a comfortable and effective fit. A shorter strap is located on the front surface of the cushion and secures the seat belt in place over the cushion, ensuring that the belt remains in the correct position at all times.

In use, the cushion of the present invention is located over the stoma, and the straps secured around the waist. The shorter strap is then wrapped over the seat belt and secured to the cushion with hook and loop material. This provides the same security and protection for the person with a stoma as any passenger in the vehicle, without subjecting him/her to any additional danger. It is very easy to use, and can be put on or taken off easily, whenever the person needs to be transported.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved supplemental car seat belt for protecting users with stomas comprising, in combination:

a belt positionable about the waist of a wearer with a stoma, the belt being formed of two components with interior ends, inboard edges, outboard edges and exterior ends the exterior ends being fabricated with intermating pile-type fasteners to allow the coupling and uncoupling thereof;

a cushion fabricated of an elastomeric foam with long upper and lower edges and short vertical side edges and with a front surface positionable away from the wearer and a rear surface positionable adjacent to the wearer, the cushion including a centrally positioned circular aperture, the circular aperture being positioned around the stoma of the user in an operative orientation, the cushion having a cover layer over its entire surface, the inboard edges of the belt components being stitched to the cover layer at an interface adjacent to the side edges and the rear surface; and a pair of supplemental belt loops, the supplemental belt loops being formed of a pair of straps having central extents secured through the front surface of the cushion through stitching with upper edges extending upwardly therefrom and downward edges extending downwardly therefrom, the upper and downward edges of the supplemental belt loops being fabricated with a pile-type fastener to allow the intercoupling of the free ends of the loops to form two closed loops for the passage therethrough of an automotive seat belt.

\* \* \* \* \*